United States Patent
Chmara et al.

(10) Patent No.: US 8,515,038 B2
(45) Date of Patent: *Aug. 20, 2013

(54) METHOD AND APPARATUS FOR CONTROLLING CALLING-PARTY IDENTIFICATION

(75) Inventors: Thomas P. Chmara, Richmond (CA); Raymond Bruce Wallace, Ashton (CA)

(73) Assignee: Rockstar Consortium US LP, Plano, TX (US)

( * ) Notice: Subject to any disclaimer, the term of this patent is extended or adjusted under 35 U.S.C. 154(b) by 74 days.

This patent is subject to a terminal disclaimer.

(21) Appl. No.: 13/171,921

(22) Filed: Jun. 29, 2011

(65) Prior Publication Data

US 2011/0261937 A1    Oct. 27, 2011

Related U.S. Application Data

(63) Continuation of application No. 11/379,595, filed on Apr. 21, 2006, now Pat. No. 7,995,727.

(51) Int. Cl.
*H04M 1/56* (2006.01)
*H04M 15/00* (2006.01)

(52) U.S. Cl.
USPC ............ 379/142.09; 379/142.05; 379/142.17; 370/352

(58) Field of Classification Search
USPC .......... 379/93.17, 93.23, 142.01, 142.03, 379/142.04, 142.05, 142.06, 142.09, 142.17, 379/245; 455/415, 416; 370/352, 400
See application file for complete search history.

(56) References Cited

U.S. PATENT DOCUMENTS

| | | | |
|---|---|---|---|
| 5,274,699 A * | 12/1993 | Ranz | 379/142.09 |
| 5,283,824 A | 2/1994 | Shaw | |
| 5,548,636 A | 8/1996 | Bannister | |
| 5,864,612 A * | 1/1999 | Strauss et al. | 379/142.03 |
| 5,901,209 A | 5/1999 | Tannenbaum | |
| 6,324,271 B1 * | 11/2001 | Sawyer et al. | 379/142.05 |
| 6,560,329 B1 | 5/2003 | Draginich et al. | |
| 6,584,505 B1 | 6/2003 | Howard | |
| 6,771,755 B1 | 8/2004 | Simpson | |
| 6,816,849 B1 | 11/2004 | Halt, Jr. | |
| 7,020,255 B2 | 3/2006 | Gruchala | |
| 7,280,647 B2 | 10/2007 | Henderson | |
| 7,551,731 B2 | 6/2009 | Durga | |
| 2002/0181681 A1 | 12/2002 | Mani | |
| 2006/0067308 A1 | 3/2006 | Cho | |
| 2007/0064895 A1 | 3/2007 | Wong | |
| 2007/0206735 A1 | 9/2007 | Silver | |
| 2007/0211873 A1 | 9/2007 | Wang | |

* cited by examiner

*Primary Examiner* — Binh Tieu
(74) *Attorney, Agent, or Firm* — Christopher & Weisberg, P.A.

(57) ABSTRACT

The present invention provides a system, method, and apparatus for managing the calling-party identification information offered to called parties. Accordingly, a caller can designate the Caller ID information to the called party based on the context of the call (e.g. the role of the caller) rather than the terminal used. Typically the calling party does this by selecting which of multiple values they wish to have sent with the call request. It is beneficial to implement such a mechanism in a secure manner—the ability to employ a different calling-number or calling-name ID should be restricted to properly-authorized and authenticated persons—in order to ensure the quality of this information. Accordingly, preferred embodiments include an authentication mechanism for verifying the calling party information is authentic.

14 Claims, 3 Drawing Sheets

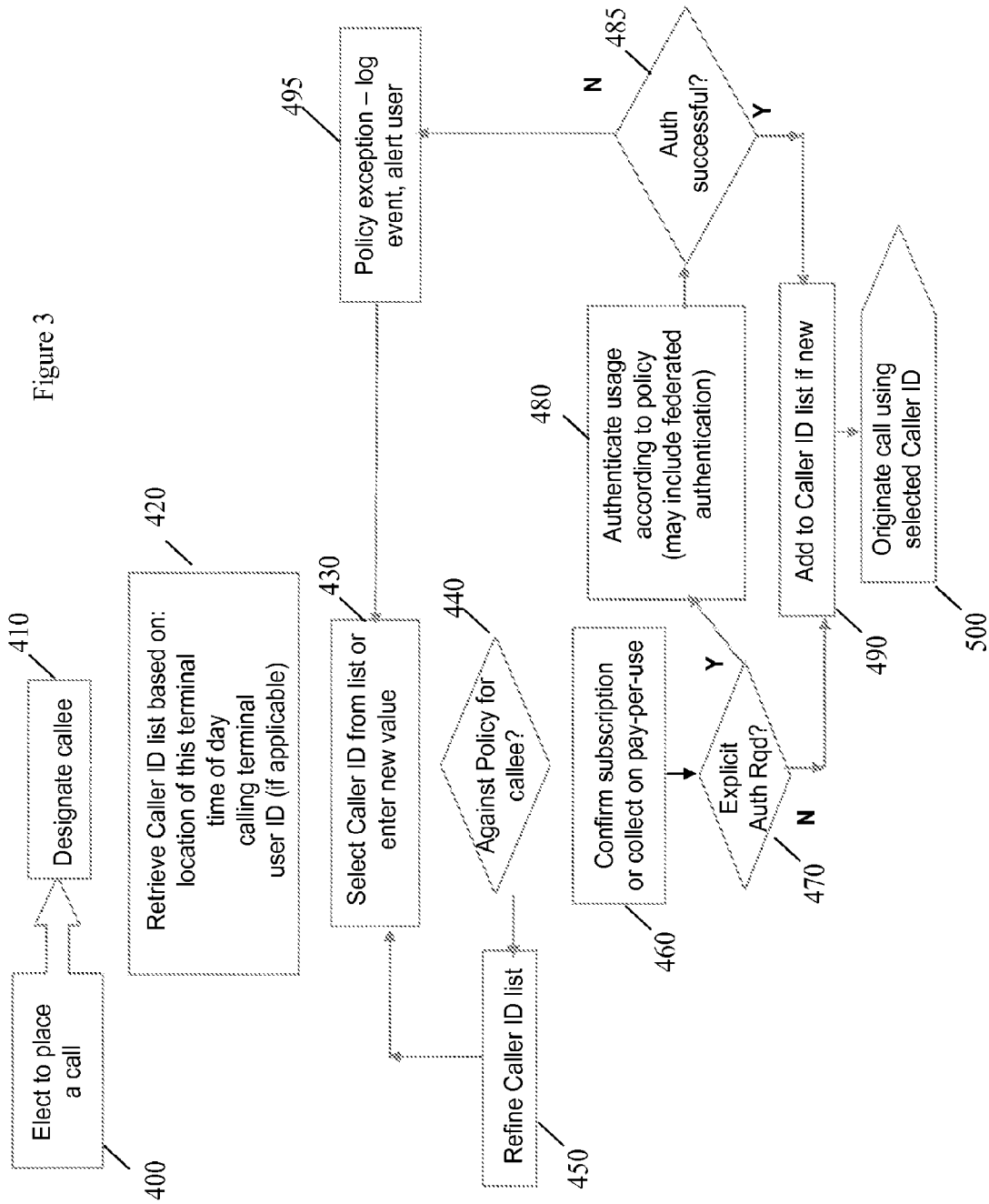

METHOD AND APPARATUS FOR CONTROLLING CALLING-PARTY IDENTIFICATION

CROSS REFERENCE TO RELATED APPLICATIONS

This application is a continuation of application Ser. No. 11/379,595, filed Apr. 21, 2006.

FIELD OF THE INVENTION

The present invention relates generally to telecommunication systems. More particularly, the present invention relates to systems which convey caller identification information (Caller ID).

BACKGROUND OF THE INVENTION

"Caller ID" subscription services offer perceived value in allowing called parties to identify callers and thereby make informed call-disposition decisions. In this specification, "Caller ID" means caller identification information and includes "Calling Number Identifier", "Calling Name Identification", and other variations used in the field.

Existing services are focused on the "receiving end"—on manipulating received calling-number and calling-name information, allowing automation of incoming-call disposition according to user and/or business policy. Disposition variables can include incoming Caller ID, time of day, current status (e.g. on the phone); service policy typically has a system default and can be tailored by the user.

The utility of these existing services relies on the accuracy and credibility of calling-name identification information. The recipient needs confidence that the calling-party's identification can be trusted. This is especially true for communications services where the end systems are not under regulatory control. A PSTN subscriber loop is relatively secure, and the calling-party identifier can generally be trusted; while it is possible to provide invalid calling-party identifiers, the problem is rare and the called party can have a high degree of confidence in the information. Consequently, current calling-number and calling-name ID information is tied to the registration (and sometimes, e.g. in the case of wire line services, to the physical location) of the caller's terminal device, which typically has one number associated with each subscriber loop.

Conversely, a poorly-managed, mis-configured, or maliciously-configured Voice over Internet Protocol (VoIP) system (e.g., one based on Session Initiation Protocol (SIP)) can offer relatively-arbitrary calling-party identification information.

Today's service providers derive large amounts of revenue from Caller ID services. Growth in remote and branch-office installations; and adoption of Voice over IP (VoIP), and other situations where the identity of the calling party may be obscured, threaten Caller ID accuracy and by extension that revenue stream.

One prior art system and method for authentication of caller identification is described in U.S. Pat. No. 6,324,271, issued Nov. 27, 2001 to Sawyer et al., and assigned to the assignee of the present application, which is hereby incorporated by reference. "Sawyer" is focused on authenticating the identity of a calling party regardless of the location or terminal the user is calling from—the same identity can be offered regardless of whether the user is dialing in from a payphone, from their residence, desk phone, or cell.

However, many people serve in multiple roles through the course of the day. One prior art Method and Apparatus for Providing User Controlled Call Management Services is described in U.S. Pat. No. 5,548,636, issued Aug. 20, 1996 to Bannister et al., and assigned to the assignee of the present application, which is hereby incorporated by reference. Bannister deals with call management services, which allows a called party to have calls routed to different terminals. Bannister recognizes that the Called party will have different roles, and will not necessarily know whether a re-routed call to the called party's cell phone was originally destined to the called party's office phone or home phone. Accordingly Bannister teaches a method and apparatus for advising the called party of the role to which a received call was originally directed.

These two inventions deal with, first, offering a unique calling identity regardless of the nature of the originating device; the second is focused on aiding the called party in managing incoming calls.

Reference is also made to US patent application by Steeves et. al., filed Jun. 20, 2001 with Ser. No. 09/884,346, entitled Method for Privacy and Personalization on IP Networks, and assigned to the assignee of the present application, which is hereby incorporated by reference. None of these references aid a caller in controlling the outgoing calling information to better represent the context of their call.

A person with multiple roles may want to make a call relating to one role in a spare moment snatched from another, or while at home. For example, consider a physician who runs a private practice, maintains a home office, has admitting privileges at a local hospital, and volunteers at a local HIV clinic. In the struggle to keep up, she catches up on her work in those various capacities whenever and wherever she can. However, placing a call from one location, but relating to a different capacity or function (hereafter "role"), can inadvertently provide misleading (and potentially private) information to the called party. Depending on what is displayed, the information delivered to the called party in the Caller ID field may have connotations which are inaccurate, potentially alarming, and may not offer appropriate privacy protection.

In addition to creating opportunities for misunderstanding and poor call-disposition decisions, the calling information may not be useful to the called party—if recorded by a Caller ID device or voicemail, as the called party may not have the correct information to properly return the call.

Many scenarios can be envisioned—for example, teachers calling parents to report students' performance concerns would prefer to leave the school's switchboard number than that of their own home telephone—and the school number is more useful to the concerned parent.

Conventional systems allow some measure of privacy protection by being able to suppress the Caller ID field. However, this typically results in a blocked number being presented to the caller, who may ignore the call in order to avoid telemarketers, which is problematic, especially for situations where voice messages are inappropriate.

A preferable scenario might be to leave the number of the hospital switchboard for a hospital patient; or the doctor's private practice number for the call about his patient's annual physical; or the school's number for a teacher.

SUMMARY OF THE INVENTION

It is, therefore, desirable to be able to provide Caller ID information which is attributed to the role (e.g., function) of the caller, rather than the device used by the caller. Thus the present invention provides a system, method, and apparatus for managing the calling-party identification information offered to called parties. Accordingly, a caller can designate the Caller ID to be conveyed to the called party based on the caller's preference and assessment of the context of the call. According to a preferred embodiment the calling party does this by selecting which of multiple values they wish to have sent with the call request.

In a first aspect, the present invention provides a method of operating a first communication device connected to a communication network, the first communication device being operable with the communication network to connect to a second communication device. The method comprises: initiating at the first device a call to the second device; receiving, from the network at the first device, caller identification options; presenting the received caller identification options to a caller at the first device; receiving from the caller at the first device, a selection of a caller identification option; and sending to the network an indication of the selected caller identification option to determine caller identification information presented to the second communication device.

In the method of the first aspect, the caller identification options can comprise pre-authenticated caller identification options.

The method of the first aspect can further comprise sending a calling party personal identifier to a network entity, and receiving caller identification options can comprise receiving caller identification options associated with the calling party personal identifier subsequent to sending the calling party personal identifier.

The method of the first aspect can further comprise: receiving, from the network at the first device, a challenge message; presenting the received challenge message to a caller at the first device; receiving from the caller at the first device a challenge response; and sending to the network an indication of the challenge response.

The method of the first aspect can further comprise: sending a first device identifier to the network from the first device; and receiving the caller identification options from the network at the first device subsequent to sending the first device identifier to the network.

In the method of the first aspect, the caller identification options can comprise multiple identities associated with a caller associated with the first device.

In the method of the first aspect, presenting the received caller identifications can comprise ordering the caller identification options based on a calling party profile. The calling party profile can contain at least one calling party data element selected from a group consisting of: calling party provided caller identification information; location of the first device; time of day; presence information; and called party information.

In a second aspect, the present invention provides a first communication device operable with a communication network to connect to a second communication device. The first communication device comprises: a transmitter operable to initiate a call to the second communication device over the communication network; a receiver operable to receive from the network caller identification options associated with the first communication device; a caller presentation element operable to present the received caller identification options to a caller; an option selection element operable to receive from the caller a selection of one of the presented caller identification options; the transmitter being further operable to send to the network an indication of the selected caller identification option to determine caller identification information to present to the second communication device.

In the device of the second aspect, the caller identification options can comprise pre-authenticated caller identification options.

In the device of the second aspect, the transmitter can be further operable to send a calling party personal identifier to a network entity; and the receiver can be operable to receive caller identification options associated with the calling party personal identifier subsequent to the transmitter sending the calling party personal identifier.

In the device of the second aspect, the receiver can be operable to receive from the network, a challenge message; the caller presentation element can be operable to present the received challenge message to a caller at the first device; the option selection element can be operable to receive from the caller at the first device a challenge response; and the transmitter can be operable to send to the network an indication of the challenge response.

In the device of the second aspect, the transmitter can be operable to send a first device identifier to the network; and the receiver can be operable to receive the caller identification options from the network subsequent to the transmitter sending the first device identifier to the network.

In the device of the second aspect, the caller identification options can comprise multiple identities associated with a caller associated with the first device.

In the device of the second aspect, presenting the received caller identifications can comprise ordering the caller identification options based on a calling party profile. The calling party profile can contains at least one calling party data element selected from a group consisting of: calling party provided caller identification information; location of the first device; time of day; presence information; and called party information.

Embodiments of the invention are applicable to existing TDM telephony systems as well as to VoIP systems and other systems which offer or could offer calling identification.

Note many voice mail systems can store the Caller ID information in order to easily return a call. Therefore it is beneficial for the appropriate Caller ID information to be conveyed, not just for call disposition purposes (i.e., so the recipient can decide whether to answer), but for call return purposes.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 3 is a flow chart illustrating the steps executed by the call server (with input from the user through an appropriate interface) according to an embodiment of the invention.

DETAILED DESCRIPTION

Generally, the present invention provides a system, method, and apparatus for managing the contextual information (e.g., calling-party identification) offered to called parties. This is accomplished by providing a system which allows a calling party to designate the contextual information (Context Info) to be conveyed to the called party. Typically the calling party does this by specifying a value to be used as the calling-party identification; a preferred embodiment will include a default or provisioned selection of alternative identifiers, with the calling party selecting which of multiple values they wish to have sent with the call request. Preferred embodiments include an authentication mechanism for validating the calling party information.

Existing Caller ID systems associate a default identity with the terminal or location. An embodiment of the invention introduces the ability to implicitly associate multiple identities with a terminal or location (e.g. an executive's desk phone could be provisioned to offer as alternatives the executive's phone number, the number for the administrative assistant, and the contact information for the company switchboard) any of which are selectable by the caller. In this case, the service provider or enterprise who administers the numbers or extensions has administrative control over the use of those numbers.

Identities can also be associated with the caller, who as discussed, may serve in several different roles, and will want an Identity (Caller ID) for each role. The caller has access to these identities as well, which are often independent of the Caller IDs associated with a given terminal or location, and can be administered by different domains. However, in order to have the flexibility of allowing any caller to select the Caller ID from a given terminal, it is desirable to have an authentication stage completed. This authentication involves supplying sufficient information to establish the caller's right to the Caller Identification information and can take various forms, including a PIN code on a cell phone, a challenge-response authentication in the case of a SIP registration, or implicit authentication based on physical access to the terminal (to a residence phone, to a device in a private office, to a cellular handset). Again, the service provider or enterprise administering these terminal devices and the caller's account has administrative control over these identities.

A caller may have the calling identification provisioned against the terminal, against the caller's profile, or can enter the desired calling identification at the time the call is being placed. This identification can take the form, without restriction, of a numeric, alphanumeric, graphical, spoken, animated, visual or biometric identification; and can be entered at the terminal or by reference using keypads, biometric devices, and other input-output peripheral equipment.

Figure 1:
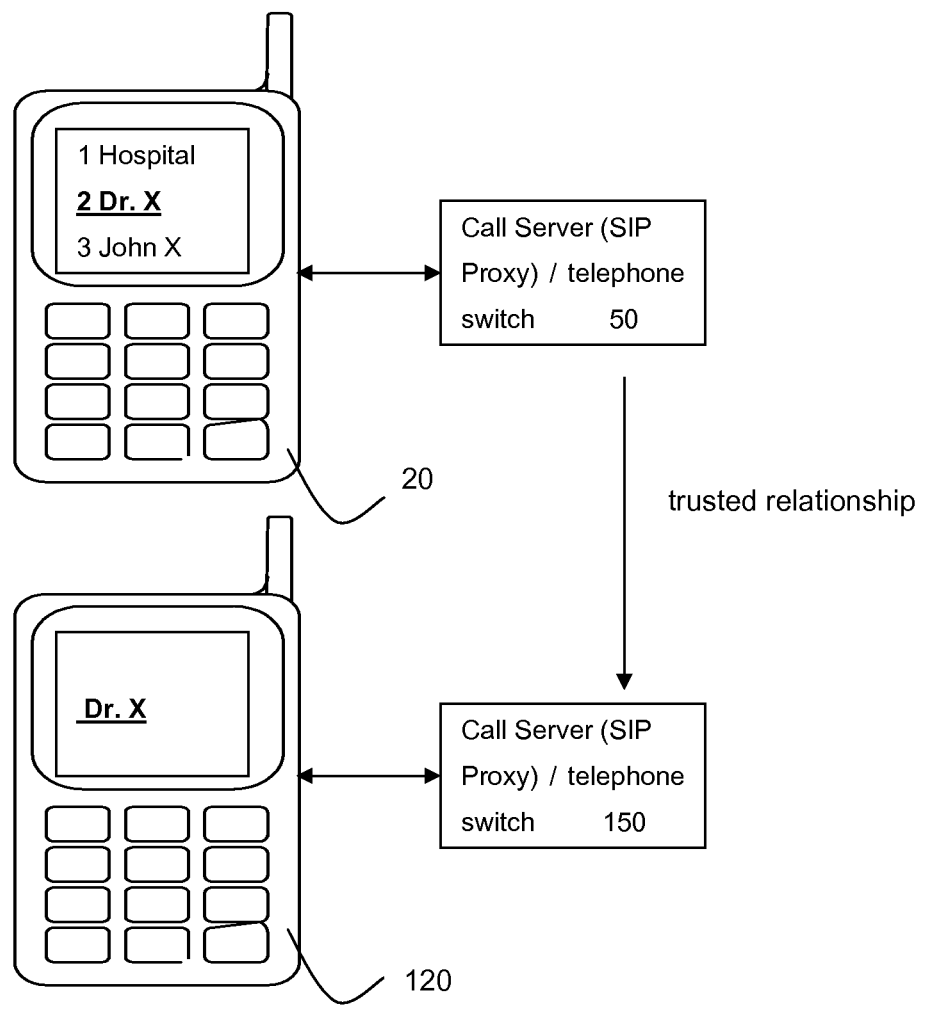
FIG. 1 is a conceptual drawing which illustrates an example, according to an embodiment of the invention, where each party to the call uses a managed communications service.

FIG. 1 illustrates an example, according to an embodiment of the invention, where each party to the call uses a managed communications service (e.g., the PSTN service; or a managed VoIP service). Calling Party 20, which uses a calling service administered by a calling server 50 (which can be a TDM switch or a VoIP call server, or . . . ). The Calling Party 20 calls the Called Party 120, which uses a calling service administered by a calling server 150. Note the calling servers need not be of the same type, or even be administered by the same network. Conversely, both the Called Party 120 and the Calling Party 20 can use the same Calling server. In this case, the entity that has administrative control over the calling-party's service (Call server 50) is responsible for performing the above authentication step. That entity either has or establishes a trust relationship with the call server 150 used by the called party 120. The calling-party's entity submits the selected calling-party identifier as part of the signaling for the call to the called-party's service-provider entity, and it is propagated to the called party's terminal in a manner appropriate to that party's service and technology. Because the called party also has a trust relationship with its own service provider, the trust chain is maintained and the calling-party identification can be considered relatively reliable. The trusted relationship can be established directly between the call servers. This trusted relationship can be intrinsic, or negotiated.

As can be seen, in this example where the calling party is a physician, the calling party is provided with a plurality of previously authorized identities. The Calling party selects the identity appropriate for the context of the call (in this example Dr. X) which is then conveyed to the called party.

Figure 2:
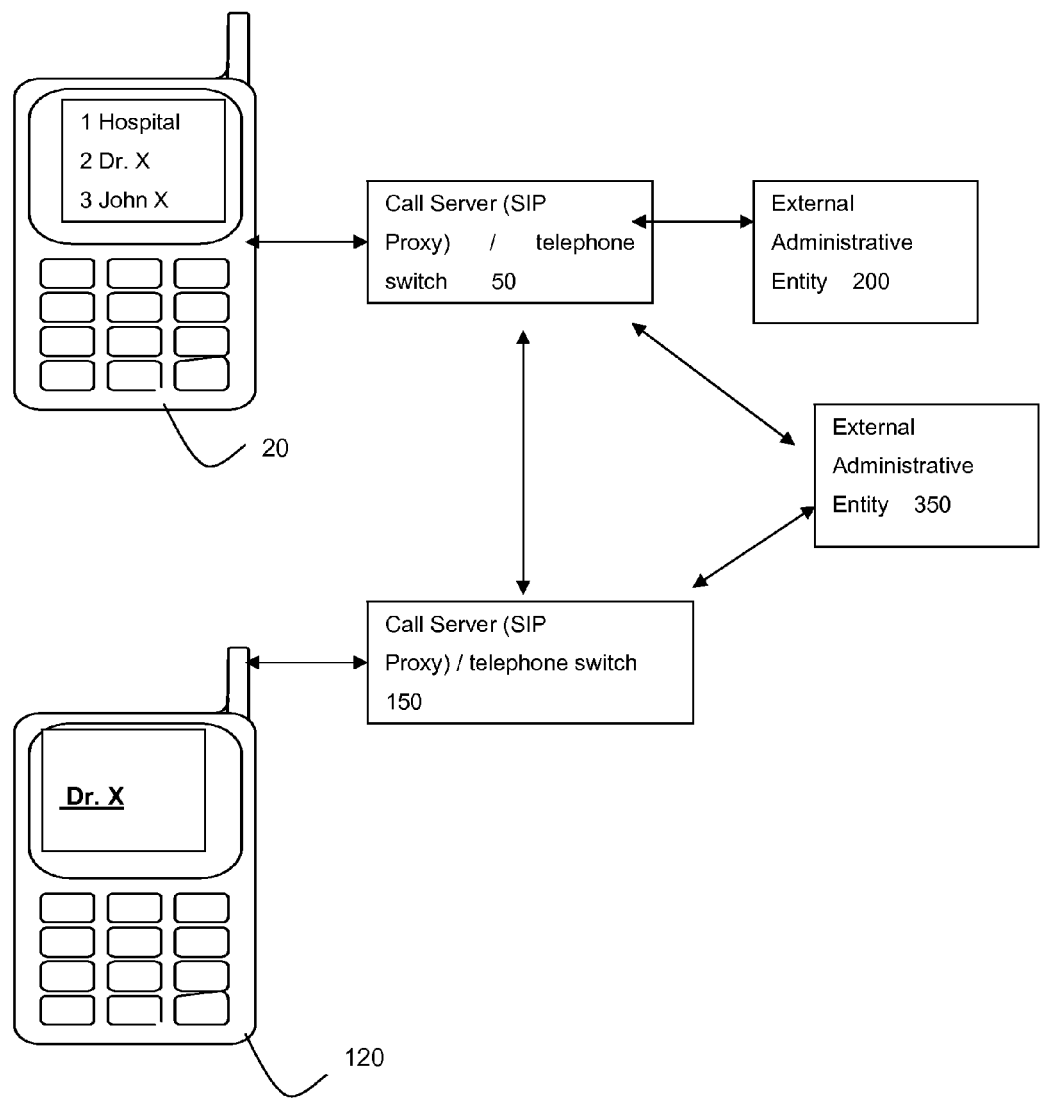
FIG. 2 is a conceptual drawing which illustrates the same example, according to another embodiment of the invention, where external administrative entities are used for authentication purposes.

FIG. 2 illustrates the use of an optional External Administrative Entity 350, which provides authentication to both servers to provide the trusted relationship 300. Such a system can use an externally-visible trusted element for the authentication.

Embodiments of the invention can also allow callers to offer values of calling identification where the administrative control over those identifiers does not reside with the provider or enterprise administering the communications service, but rather with other agencies, firms, or services. An example, without restriction, of such a situation is that of a physician placing a call from their home office, and selecting the calling identification of the hospital to which they have admitting privileges. In this case, the service provider offering the communications service (the physician's home telephone service provider) does not have administrative control over the calling identification selected—this is held by the hospital. A validation mechanism is needed to authorize such use, as will be described in more detail below.

Where the identity selected is not administered by the entity providing the communications service, the communications service contacts the administrative entity associated with the offered calling identifier to establish the caller's authorization to employ that calling identifier. This contact can be made at the time of the call; or ahead of time and a record of that authentication, optionally associated with a mechanism for expiring that authentication, being associated with the caller's profile. The record may indicate that existing authentications are sufficient for use of this identifier; or alternatively, the record may take the form of credentials used in a challenge-response exchange to be conducted with the calling party, or directions on the means, entities, and protocols to be used to perform a dynamic authentication action. The communications service will facilitate the authentication function as directed. Such a scenario is also illustrated in FIG. 2, in which Call Server 50 contacts an appropriate External Administrative Entity 200 which authenticates the selected caller identifier for the calling party 20. Note in this preferred embodiment, neither the Called Party 120 or its Call Server 150 needs to interact with the External Administrative Entity 200. Here, the Call Server 50 either has or establishes a trust relationship with the called Party's Server 150—and this trust chain is sufficient for the called party to accept that the authentication has been properly conducted. Alternatively, in another preferred embodiment, either with or absent a trust relationship between the call servers, the calling party's call server can forward confirmation of authorization in some form (one example without limitation being an assertion, token, or certificate) which can be independently verified by the called party's call server and/or the called party themselves. Note the FIG. 2 shows both External Administrative Entity 200 and External Administrative Entity 350, for ease of illustration, and to clarify the differences between them. However, it should be noted that one, both, or neither entity can be used, based on the circumstances.

It is possible for either the calling or called party, or both, to perform communications services without a service provider (e.g. using a VoIP client). In such a case, no end-to-end trust chain exists. Where a calling party has no managed service provider to attest on its behalf, the called party can authenticate with the service entity of the called party. This may be done using digital signatures or other form of third-party attestation (e.g. involving a certificate authority) or by other means. The calling party authenticates with the administrative entity that owns the selected identifier, and the calling party will secure an attestation (which can take the form of a digital signature) which can be forwarded with the calling identifier (or be made available in response to a request by the calling-party's administrative entity) to prove legitimacy of use of the calling identifier. The called party's entity (or, where it exists, the called party's service provider call server or proxy) can confirm the legitimacy of the use of the identifier by referring back to the offered certificate or back to the issuing party.

FIG. 3 is a flow chart illustrating the steps executed by the call server (with input from the user) according to an embodiment of the invention. First the calling party elects to place a call for 100 by designating a called party (callee) 410. This can take the form of simply entering a phone number associated with the callee. The calling party then designates a Caller ID, for example by selecting from a Caller ID list. The retrieved list 420 can be provisioned in advance, or it can be based on criteria which can include any or all of the location of the terminal used by the calling party, the time of day, the called party and the calling terminal or by a user ID entered by the calling party. Note that the order the potential Caller IDs presented to the user can differ, based on an estimation of which is the most likely Caller ID to be selected, for example, based on presence information. For example, during a work day, a work related Caller ID may be more likely to be selected than a personal Caller ID, and vice a versa for the weekend. Note that if the subscriber subscribes to "presence" services, than these can be used in determining the order the Caller IDs are presented to the user. For example, if a doctor is in his clinic, and attempts to make a call from his cell phone, the clinic switch board may be presented above the default cell phone Caller ID, in order to make it easier to select it.

The calling party then selects a Caller ID from the list, or alternatively will enter a value 430. The selected Caller ID is optionally verified against policy for the callee, and if rejected refined Caller ID list 450 is provided to the calling party from which to reselect.

If the call server 50 is part of service provider network which charges for the selectable Caller ID feature, then optionally it can confirm the subscription or collect a pay per use service fee 460. Of course this step will not be necessary for an enterprise provider. Optionally, an explicit authorization requirement check is made 470 which may lead to an authentication step 480 to determine that the calling party can use the selected Caller ID according to policy. Note that a user's authentication may need to be established across multiple administrative domains or IT systems. Assuming the authentication is successful 485 (or if no authentication is used) the call is originated using the selected Caller ID 500, and optionally, the designated Caller ID is added to the Caller ID list if it was a newly entered value. If the authentication is not successful at step 485 a policy exception step may be executed 495 that logs the event and alerts the user who may reselect a Caller ID from a list or enter a new value. The called parties can optionally validate the Caller ID tag with an external administrative entity 200 or with the call server 50. Note such authentication may be implicit as in the traditional directory number based on the PSTN physical plan.

Note for step 420 a policy engine can be queried which uses context, policy, and user direction to select the Caller ID to offer for the session. Such a policy engine may be a separate entity or may form part of a call server 50, or may be implemented on a terminal device.

The operation of these functionalities is discussed in further detail later herein. However, those of ordinary skill will recognize that the features of these functionalities can be implemented using processing hardware and software, such as computers or microprocessors and corresponding program and data memories. Such processors can be individual local processors or can be implemented in a central processor. Distributed processing techniques may also be used. Additionally, individual functions can be built in hard wired logic as may be desirable for the system implementation. Thus, the system according to the invention is not limited by the form of computer or processor construction, but can be implemented using any processing technique now known or later developed. Those of ordinary skill will recognize that an call server according to the invention can be implemented in a single processor or single unit or can be implemented in a plurality of units performing portions of the overall call server functions. Thus aspects of the invention can be implemented in a call server, telephony switch, or software for controlling either. Furthermore, portions of the invention can be implemented within software running on the terminal device.

For example, a terminal device can include software, executed on a processor for displaying a set of previously authorized Caller ID values to a caller, and receiving a selection from said caller of the designated Caller ID. Note that the set of previously authorized Caller IDs can be displayed based on an estimation of which is the most likely Caller ID to be selected, based on any combination of context, policy, presence information and user direction. The terminal can then send the designated Caller ID to a call server (via the terminal's service provider), which then determines the administrative entity which can authenticate the designated Caller ID, authenticate the caller's permission to use said Caller ID and then conveys the designated Caller ID to the called party as part of call set up procedures. However, this is but one example. The terminal can be pre-provisioned with a set of multiple Caller IDs, each of which has been previously approved. In which case the authentication step is effectively done in advance.

Embodiments of the invention may be represented as a software product stored on a machine-readable medium (also referred to as a computer-readable medium, a processor-readable medium, or a computer usable medium having a computer readable program code embodied therein). the machine-readable medium may be any type of magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data. Those of ordinary skill in the art will appreciate that other instructions and operations necessary to implement the described invention may also be stored on the machine-readable medium. Software running from the machine readable medium may interface with circuitry to perform the described tasks.

The above-described embodiments of the present invention are intended to be examples only. Alterations, modifications and variations may be effected to the particular embodi-

What is claimed is:

1. A method of operating a first communication device connected to a communication network, the first communication device configured to connect to a second communication device via the communication network, the method comprising:
    initiating at the first device a call to the second device;
    receiving, from the communication network at the first device, caller identification options, the caller identification options comprising pre-authenticated caller identification options;
    presenting the received caller identification options to a caller at the first device;
    receiving from the caller at the first device, a selection of a caller identification option; and
    sending to the communication network an indication of the selected caller identification option to determine caller identification information presented to the second communication device.

2. The method of claim 1, further comprising sending a calling party personal identifier to a network entity, wherein receiving caller identification options comprises receiving caller identification options associated with the calling party personal identifier subsequent to sending the calling party personal identifier.

3. The method of claim 1, further comprising:
    receiving, from the communication network at the first device, a challenge message;
    presenting the received challenge message to a caller at the first device;
    receiving from the caller at the first device a challenge response; and
    sending to the communication network an indication of the challenge response.

4. The method of claim 1, further comprising:
    sending a first device identifier to the communication network from the first device; and
    receiving the caller identification options from the communication network at the first device subsequent to sending the first device identifier to the communication network.

5. The method of claim 1, wherein the caller identification options further comprise multiple identities associated with a caller associated with the first device.

6. The method of claim 1, wherein presenting the received caller identification options comprises ordering the caller identification options based on a calling party profile.

7. The method of claim 6, wherein the calling party profile contains at least one calling party data element selected from a group consisting of:
    calling party provided caller identification information;
    location of the first device;
    time of day;
    presence information; and
    called party information.

8. A first communication device configured to connect to a second communication device via a communication network, the first communication device comprising:
    a transmitter configured to initiate a call to the second communication device over the communication network;
    a receiver configured to receive from the communication network caller identification options associated with the first communication device, the caller identification options comprising pre-authenticated caller identification options;
    a caller presentation element configured to present the received caller identification options to a caller;
    an option selection element configured to receive from the caller a selection of one of the presented caller identification options;
    the transmitter being further configured to send to the communication network an indication of the selected caller identification option to determine caller identification information to present to the second communication device.

9. The device of claim 8, wherein:
    the transmitter is further configured to send a calling party personal identifier to a network entity; and
    the receiver is further configured to receive caller identification options associated with the calling party personal identifier subsequent to the transmitter sending the calling party personal identifier.

10. The device of claim 8, wherein:
    the receiver is further configured to receive from the communication network, a challenge message;
    the caller presentation element is further configured to present the received challenge message to a caller at the first device;
    the option selection element is further configured to receive from the caller at the first device a challenge response; and
    the transmitter is further configured to send to the communication network an indication of the challenge response.

11. The device of claim 8, wherein:
    the transmitter is further configured to send a first device identifier to the communication network; and
    the receiver is further configured to receive the caller identification options from the communication network subsequent to the transmitter sending the first device identifier to the communication network.

12. The device of claim 8, wherein the caller identification options further comprise multiple identities associated with a caller associated with the first device.

13. The device of claim 8, wherein presenting the received caller identification options comprises ordering the caller identification options based on a calling party profile.

14. The device of claim 13, wherein the calling party profile contains at least one calling party data element selected from a group consisting of:
    calling party provided caller identification information;
    location of the first device;
    time of day;
    presence information; and
    called party information.

* * * * *